(12) United States Patent
Darrington et al.

(10) Patent No.: US 9,104,617 B2
(45) Date of Patent: Aug. 11, 2015

(54) USING ACCELERATORS IN A HYBRID ARCHITECTURE FOR SYSTEM CHECKPOINTING

(75) Inventors: David L Darrington, Rochester, MN (US); Matthew W Markland, Rochester, MN (US); Philip James Sanders, Rochester, MN (US); Richard Michael Shok, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1500 days.

(21) Appl. No.: 12/270,144

(22) Filed: Nov. 13, 2008

(65) Prior Publication Data

US 2010/0122199 A1    May 13, 2010

(51) Int. Cl.
| | |
|---|---|
| G06F 15/16 | (2006.01) |
| G06F 11/14 | (2006.01) |
| H04L 29/06 | (2006.01) |
| G06F 11/20 | (2006.01) |

(52) U.S. Cl.
CPC ........ G06F 11/1438 (2013.01); H04L 63/0227 (2013.01); *G06F 11/20* (2013.01)

(58) Field of Classification Search
CPC .................................................. H04L 63/0227
USPC ............ 709/201, 202, 223; 717/151; 728/100
See application file for complete search history.

(56) References Cited

U.S. PATENT DOCUMENTS

| | | | |
|---|---|---|---|
| 6,393,474 B1 * | 5/2002 | Eichert et al. ................. | 709/223 |
| 6,701,345 B1 * | 3/2004 | Carley et al. .................. | 709/205 |
| 2005/0125513 A1 * | 6/2005 | Sin-Ling Lam et al. ...... | 709/220 |
| 2008/0195847 A1 * | 8/2008 | Wu et al. ....................... | 712/216 |

OTHER PUBLICATIONS

John Devale, Checkpoint-Recovery,Sping 1999,18-849 Dependable Embedded Systems.*

* cited by examiner

*Primary Examiner* — Adnan Mirza
(74) *Attorney, Agent, or Firm* — Martin & Associates, LLC; Bret J. Petersen

(57) ABSTRACT

A hybrid node of a High Performance Computing (HPC) cluster uses accelerator nodes for checkpointing to increase overall efficiency of the multi-node computing system. The host node or processor node reads/writes checkpoint data to the accelerators. After offloading the checkpoint data to the accelerators, the host processor can continue processing while the accelerators communicate the checkpoint data with the host or wait for the next checkpoint. The accelerators may also perform dynamic compression and decompression of the checkpoint data to reduce the checkpoint size and reduce network loading. The accelerators may also communicate with other node accelerators to compare checkpoint data to reduce the amount of checkpoint data stored to the host.

20 Claims, 5 Drawing Sheets

USING ACCELERATORS IN A HYBRID ARCHITECTURE FOR SYSTEM CHECKPOINTING

BACKGROUND

1. Technical Field

The disclosure and claims herein generally relate to hybrid-architecture, multi-node computer systems, and more specifically relate to using accelerators for checkpointing in a hybrid architecture system.

2. Background Art

Supercomputers and other multi-node computer systems continue to be developed to tackle sophisticated computing jobs. One type of multi-node computer systems begin developed is a High Performance Computing (HPC) cluster. A HPC cluster is a scalable performance cluster based on commodity hardware, on a private system network, with open source software (Linux) infrastructure. The system is scalable to improve performance proportionally with added machines. The commodity hardware can be any of a number of mass-market, stand-alone compute nodes as simple as two networked computers each running Linux and sharing a file system or as complex as 1024 nodes with a high-speed, low-latency network. One type of HPC cluster is a Beowulf cluster. However, the HPC clusters as described herein have considerably more power than what was originally considered in the Beowulf concept.

A HPC cluster is being developed by International Business Machines Corporation (IBM) for Los Alamos National Laboratory and the US Department of Energy under the name Roadrunner Project, which is named after the New Mexico state bird. (References to the IBM HPC cluster herein refer to this supercomputer.) In the IBM HPC cluster, chips originally designed for video game platforms work in conjunction with systems based on x86 processors from Advanced Micro Devices, Inc. (AMD). IBM System X™ 3755 servers based on AMD Opteron™ technology are deployed in conjunction with IBM BladeCenter® H systems with Cell Enhanced Double precision (Cell EDP) technology. Designed specifically to handle a broad spectrum of scientific and commercial applications, this HPC cluster design includes new, highly sophisticated software to orchestrate over 13,000 AMD Opteron™ processor cores and over 25,000 Cell EDP processor cores. The supercomputer will employ advanced cooling and power management technologies and will occupy only 12,000 square feet of floor space.

Computer systems such as the IBM HPC have a hybrid architecture. A hybrid architecture consists of a cluster of homogeneous processing elements each of which may have multiple accelerator elements of a different processing architecture available to them for use. These accelerator elements may be specialized units designed for specific problems or more general purpose processors. In the IBM HPC, each hybrid node has a host processor and two accelerators. Each node has a hierarchical communication network where the homogeneous element, often called the host element or host processor, serving as the root of the communication tree. In the IBM HPC, the host processor is an Advanced Micro Devices (AMD) Opteron™ processor core and the two accelerators are Cell EDP processor cores.

As the size of clusters continues to grow, the mean time between failures (MTBF) of clusters drops to the point that runtimes for an application may exceed the MTBF. Thus, long running jobs may never complete. The solution to this is to periodically checkpoint application state so that applications can be re-started and continue execution from known points. Typical checkpointing involves bringing the system to a know state, saving that state, then resuming normal operations. Restart involves loading a previously saved system state, then resuming normal operations. MTBF also limits systems scaling. The larger a system is, the longer it takes to checkpoint. Thus efficient checkpointing is critical to support larger systems. Otherwise, large systems would spend all of the time checkpointing.

What is needed are efficient checkpointing methods for multi node computer systems. In a multimode computer system or cluster checkpointing may substantially reduce the efficiency of the overall computer system or cluster. Without a way to more efficiently checkpoint applications, multi-node computer systems will continue to suffer from reduced efficiency.

BRIEF SUMMARY

An apparatus and method is described for checkpointing a hybrid node of a High Performance Computing (HPC) cluster using accelerator nodes to increase overall efficiency of the multi-node computing system. The host node or processor node reads/writes checkpoint data to the accelerators. After offloading the checkpoint data to the accelerators, the host processor can continue processing while the accelerators communicate the checkpoint data with the host or wait for the next checkpoint. The accelerators may also perform dynamic compression and decompression of the checkpoint data to reduce the checkpoint size and reduce network loading. The accelerators may also communicate with other node accelerators to compare checkpoint data to reduce the amount of checkpoint data stored to the host.

The description and examples herein are directed to the IBM HPC cluster as described above, but the claims herein expressly extend to other clusters and other multiple node computer systems such as the Blue Gene computer system by IBM.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

An apparatus and method is described for checkpointing a hybrid node of a High Performance Computing (HPC) cluster using accelerator nodes to increase overall efficiency of the multi-node computing system. The host node or processor node reads/writes checkpoint data to the accelerators. After offloading the checkpoint data to the accelerators, the host processor can continue processing while the accelerators communicate the checkpoint data with the host or wait for the next checkpoint. The accelerators may also perform dynamic compression and decompression of the checkpoint data to reduce the checkpoint size and reduce network loading. The accelerators may also communicate with other node accelerators to compare checkpoint data to reduce the amount of checkpoint data stored to the host. The examples herein will be described with respect to the HPC cluster supercomputer developed by International Business Machines Corporation (IBM).

Figure 1:
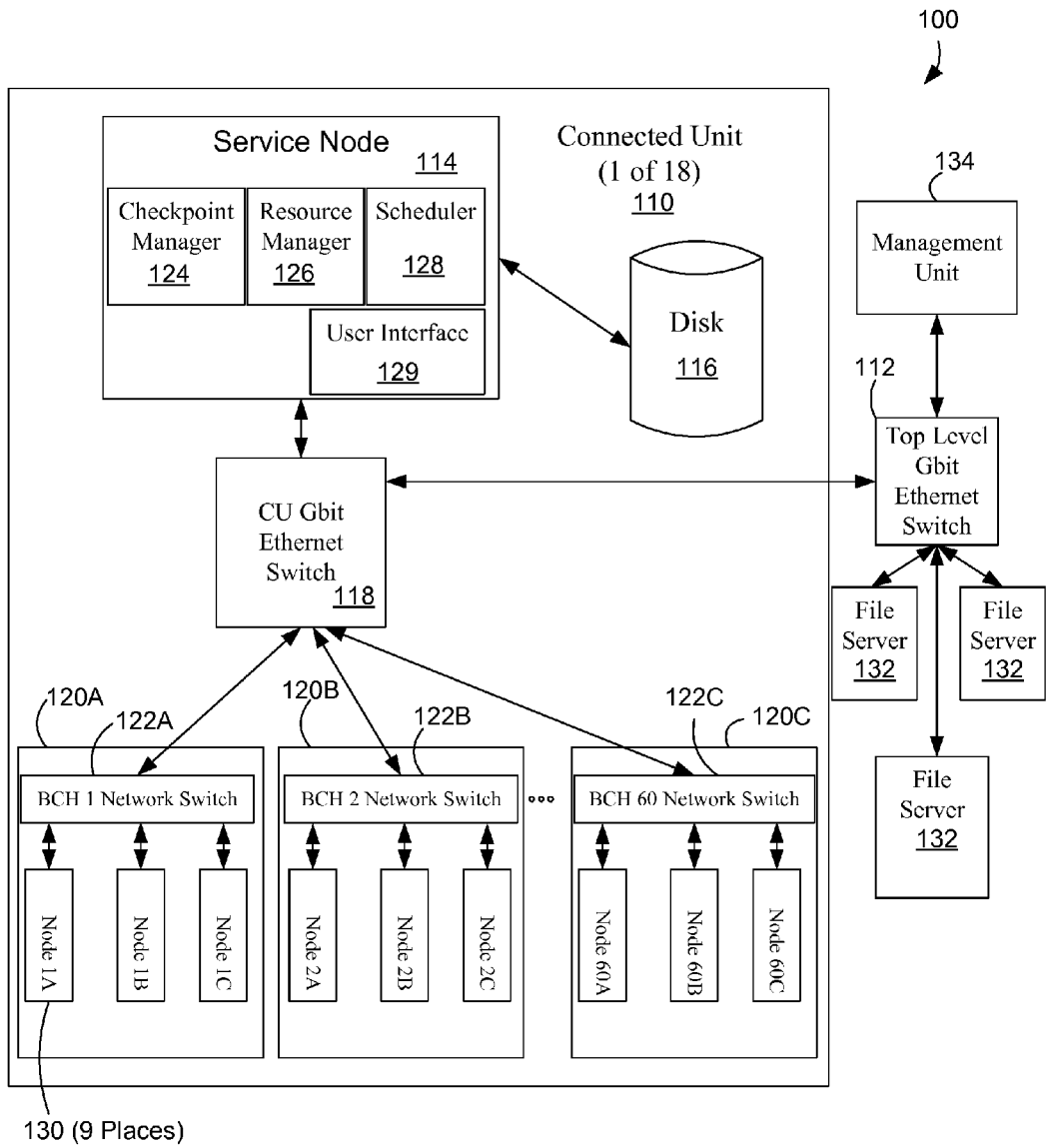
FIG. 1 is a block diagram of a multi-node computer system with a checkpoint manager that uses accelerator nodes for checkpointing the processor state to increase the overall efficiency of the system.

FIG. 1 shows a block diagram that represents a multi-node computer system 100 such as the IBM HPC cluster computer system. The IBM HPC cluster computer system 100 consists of eighteen connected units 110 that communicate through a top level gigabit (Gbit) Ethernet switch 112. Each of the connected units 110 includes a substantial amount of equipment housed in 16 computer racks. A single connected unit (CU) 110 is illustrated in the figures for simplicity. The connected unit includes a service node 114 that communicates with a disk storage unit 116. The HPC cluster is sometimes referred to as a "diskless" cluster because the individual nodes do not have disk storage (the disk storage is in the CU). The service node 114 further communicates over a CU Gbit Ethernet switch 118 to a number of blade center chassis (BCH) 120A-C.

Each connected unit 110 typically has 60 BCHs. BCH1 120A, BCH2 120B and BCH60 120C are shown in FIG. 1 for illustration. Each BCH has three nodes 130. In the IBM HPC, the nodes are sometime referred to as "hybrid nodes" since they each have three "blades". A "blade" is a circuit board with one or more processors and related circuits such as processor memory. In the IBM HPC, there are Opteron Blades (model LS21) and Cell EDP Blades (Model QS22). The LS21 has 2 Dual core Opteron chips, and the QS22 has 2 dual core Cell EDP chips. A 'hybrid node' is composed of 1 LS21 (the processor node) and 2 QS22 blades (the accelerator nodes).

Each BCH 120A-C has a network switch 122A-C that is connected to the CU Gbit Ethernet switch 118 to allow each BCH to communicate with any other BCH in the CU 110. Further, a BCH 120A-C can communicate with a BCH in another CU (not shown) through the top level switch 112. The top level switch 112 is also a Gbit Ethernet switch. The top level switch 112 connects the connected units 110 to a number of file servers 132.

Again referring to FIG. 1, the multi-node computer system 100 includes a service node 114 that handles the loading of the nodes with software and controls the operation of the CU. The service node 114 includes a checkpoint manager 124, a resource manager 126, a scheduler 128 and a user interface 129. The job scheduler 128 in the service node handles allocating and scheduling work and data placement on the compute nodes 130. The job scheduler 128 loads a job from disk storage 116 or from the file servers 132 for placement on the compute nodes. The user interface 129 is used by the system administrator to control system functions and set conditions for the checkpoint manager to operate. The resource manager 126 manages and monitors resources used by the system including the disk 116, Ethernet switches 118, 112 and the file servers 132. The checkpoint manager 124 manages the checkpointing process for each application as described further below. The service node 114 is shown as a part of the connected unit 110. Alternatively, some or all of functions of the service node may be located in a management unit 134 that is at the top level of the system 100 and is connected to the top level Gbit Ethernet switch 112. For example, a process of the checkpoint monitor may be executing in the management unit 134 to coordinate checkpointing of jobs that span multiple connected units.

Figure 2:
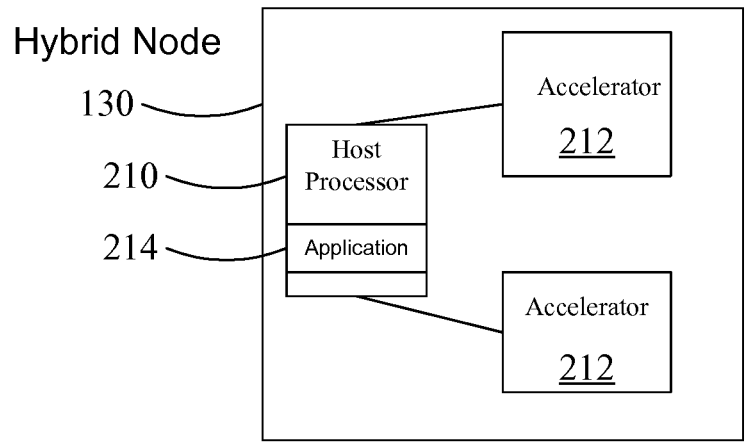
FIG. 2 is a block diagram of hybrid node of the multi-node computer system shown in FIG. 1 that illustrates a host processor with two accelerator nodes.

FIG. 2 illustrates a block diagram that represents a single hybrid node 130 as shown in FIG. 1 and described above as one of many nodes in the IBM HPC cluster computer system. Each hybrid node 130 includes a host processor 210 and two accelerators 212. The host processor has an application 214 (or applications) that need checkpointing. Where one or more of the accelerators are idle or underutilized, the accelerators are used to checkpoint the application 214 as described herein.

An accelerator 212 in the hybrid node may increase the efficiency of checkpointing of the computing system in several ways. During the checkpointing process, the host node or processor node reads/writes checkpoint data to the accelerators. Since this process is a local operation in the node the checkpointing can be completed quickly. After offloading the checkpoint data to the accelerators, the host processor can continue processing while the accelerator communicates the checkpoint data with the host or waits for the next checkpoint. The accelerators may also perform dynamic compression and decompression of the checkpoint data to reduce the checkpoint size and reduce network loading. The accelerators may also communicate with other node accelerators to compare checkpoint data to reduce the amount of checkpoint data stored to the host as described below with reference to FIG. 3.

Figure 3:
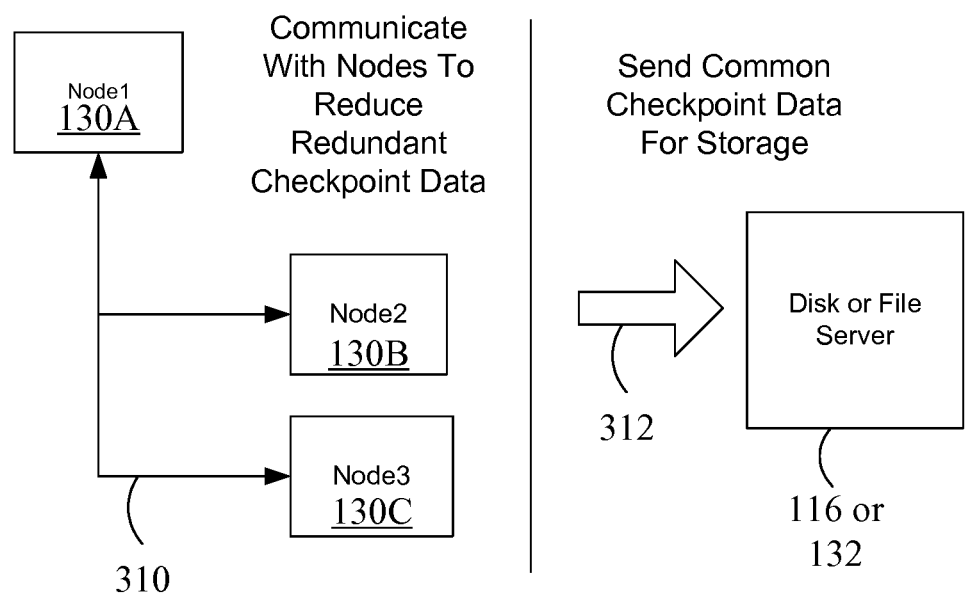
FIG. 3 is a block diagram to illustrate the accelerator comparing checkpoint data with other nodes.

FIG. 3 is a block diagram that illustrates one method for the accelerator to process the checkpoint data. Multi-node computer systems often have the same or substantially similar data stored on many nodes. The accelerator can reduce the amount of common data sent to storage for a checkpoint by comparing the checkpoint data from one node with other nodes in the multi-node computer system. As shown in FIG. 3, Node1 130A communicates 310 with Node2 130B and Node3 130C to compare checkpoint data for each of the nodes. The accelerator of Node1 then sends 312 common checkpoint data to a disk or file server (116 or 132) associated with the multi-node computer system. The accelerator may also send a single checkpoint file that represents the checkpoint for several nodes with differences for individual nodes noted in the single file or a separate file for the differences so that redundant data can be eliminated. The comparing files and generating differences can be done in any manner known in the prior art.

Figure 4:
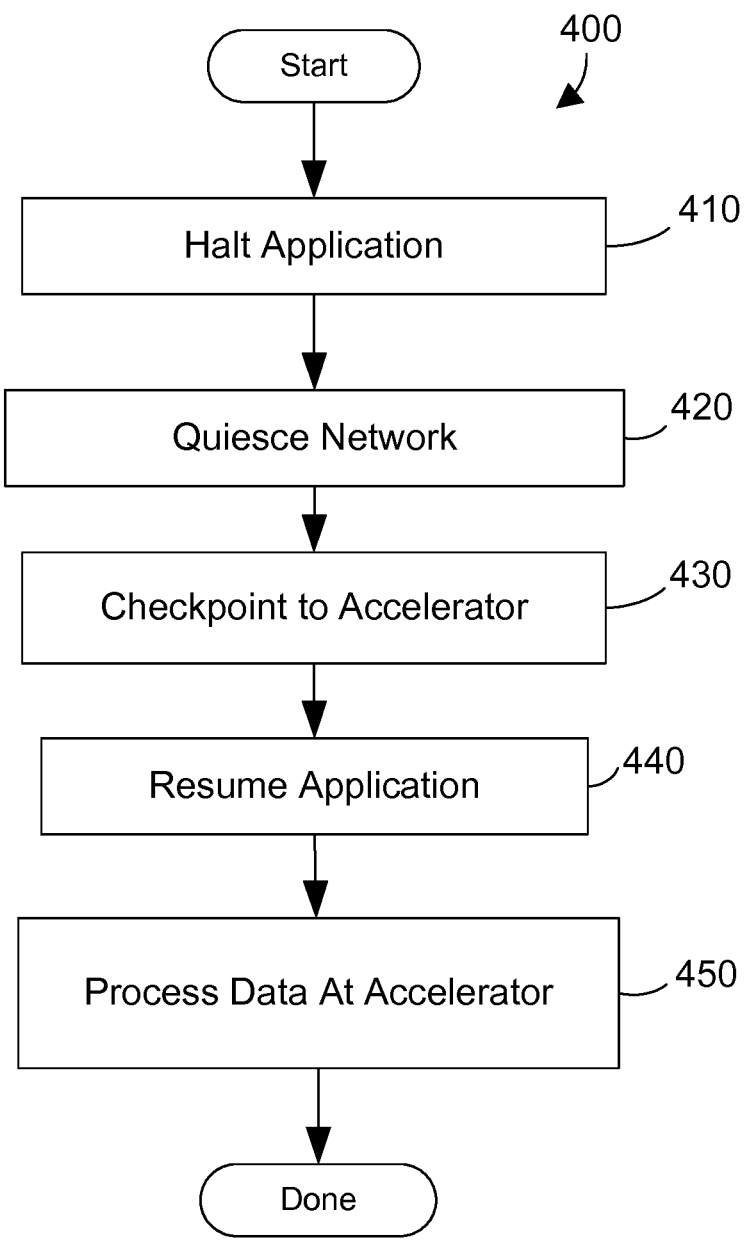
FIG. 4 is a method flow diagram for a checkpoint manager to checkpoint a hybrid node on the multi-node computer system.

FIG. 4 shows a method 400 for efficiently checkpointing an application executing on a hybrid node using an accelerator to handle the checkpoint data. The steps in method 400 are preferably performed by the checkpoint manager 124 in the service node 114 (FIG. 1) in conjunction with checkpoint management software loaded into the accelerators by the checkpoint manager. The method begins by halting the application to be checkpointed (step 410). Next, quiesce the network traffic to the node (step 420). Then checkpoint the application to one or more accelerators (step 430) and resume the application execution (step 440). The accelerator then processes the data to make the checkpoint data available if needed to restart the application from the checkpoint location (step 450). The method is then done.

Figure 5:
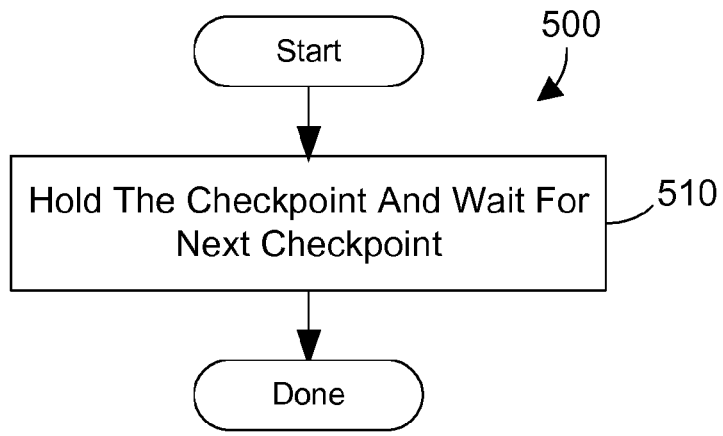
FIG. 5 is a method flow diagram for one possible implementation of step 450 in FIG. 4.

FIG. 5 shows a method 500 that is one possible implementation of step 450 in FIG. 4 to process the checkpoint data and make it available if it is necessary to restart the application from the checkpoint. In this implementation, the checkpoint data is held in the memory of the accelerator until the next checkpoint. At the next checkpoint, the checkpoint data is replaced with a new checkpoint (step 510).

Figure 6:
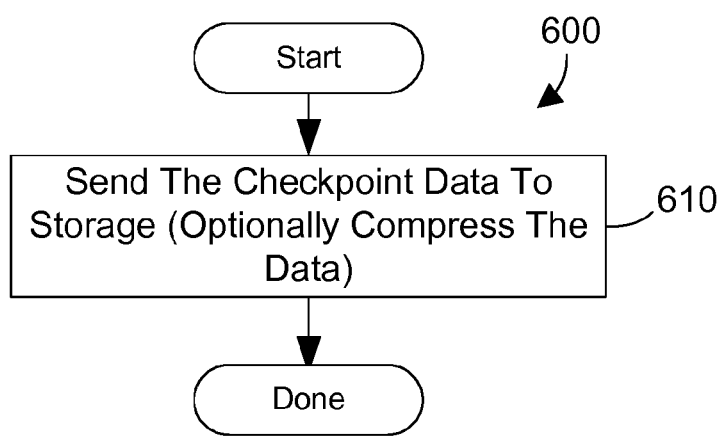
FIG. 6 is a method flow diagram for a second possible implementation of step 450 in FIG. 4.

FIG. 6 shows a method 600 that is one possible implementation of step 450 in FIG. 4 to process the checkpoint data and make it available if it is necessary to restart the application from the checkpoint. In this implementation, accelerator sends the checkpoint data to storage in the CU 110 (step 610). The storage may be the disk storage 116 or on a file server 132 (references to FIG. 1). The accelerator may optionally compress the checkpoint data to reduce the network loading to transfer the checkpoint to storage and to reduce the amount of storage space needed to store the checkpoint. The method is then done.

Figure 7:
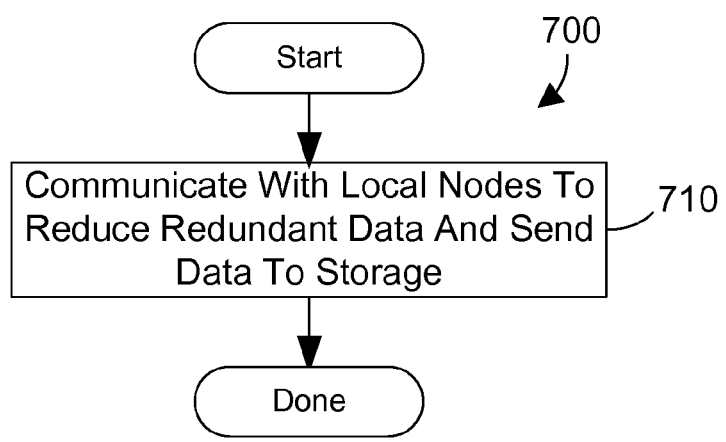
FIG. 7 is a method flow diagram for a third possible implementation of step 450 in FIG. 4.

FIG. 7 shows a method 700 that is one possible implementation of step 450 in FIG. 4 to process the checkpoint data and make it available if it is necessary to restart the application from the checkpoint. In this implementation, the accelerator communicates with other nodes to compare checkpoint data. Because nodes are often running the same application, the checkpoint data may be significantly the same. The checkpoints may be compared using common techniques and the differences stored in to the disk or file servers as discussed above (step 710). The method is then done.

Figure 8:
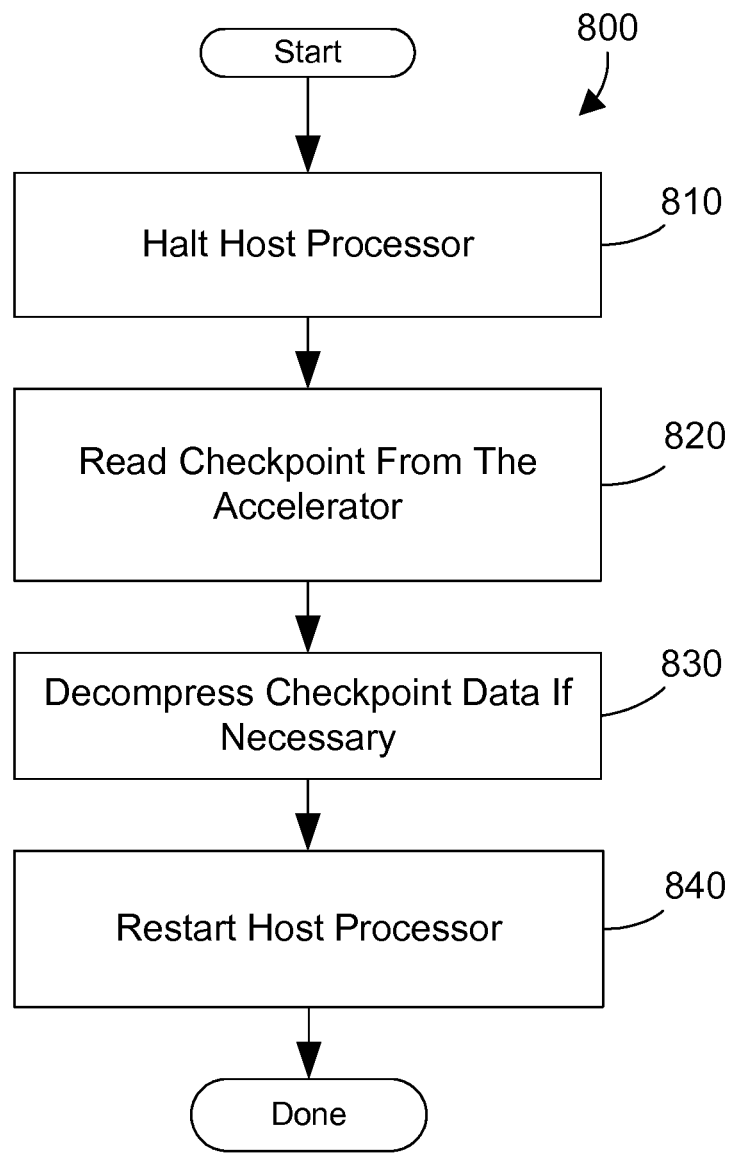
FIG. 8 is a method flow diagram for a checkpoint manager to restart an application with checkpoint data on a multi-node computer system.

FIG. 8 shows a method 800 for restarting an application from a stored checkpoint. The steps in method 800 are preferably performed by the checkpoint monitor 124 in the service node 114 (FIG. 1). The method 800 is preferably executed after a failure of the system to restart the system from a stored checkpoint. The method begins by halting the processor of the node where the checkpoint will be restarted (step 810). Next, read the stored checkpoint from the accelerator (step 820). If the checkpoint data has been compressed, then it is necessary to decompress the checkpoint data from storage (step 830). Then, restart the host processor (step 840). The method is then done.

An apparatus and method is described herein to efficiently checkpoint a hybrid node of a multi-node computer system such as a HPC using an accelerator to increase the efficiency of the cluster.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A multi-node computer system comprising:
a plurality of hybrid compute nodes that each comprise a processor and an associated accelerator local to the compute node;
checkpoint management software residing in the accelerator;
a network connecting the plurality of compute nodes and a storage mechanism;
wherein a checkpoint of the processor is made and written through a local operation in the node to the accelerator, and
wherein the checkpoint management software in the accelerator then processes the checkpoint by communicating checkpoint data over the network to the storage mechanism while the processor continues execution.

2. The multi-node computer system of claim 1 wherein the multi-node computer system is a high performance cluster computer system with the network being a private network.

3. The multi-node computer system of claim 1 wherein a checkpoint manager in a service node manages checkpointing.

4. The multi-node computer system of claim 1 further comprising a user interface that allows a system administrator to set conditions for the checkpoint manager.

5. The multi-node computer system of claim 1 wherein the accelerator sends the checkpoint to the storage mechanism.

6. The multi-node computer system of claim 5 wherein the accelerator compresses the checkpoint prior to sending the checkpoint to the storage mechanism.

7. The multi-node computer system of claim 1 wherein the accelerator communicates with other compute nodes to compare the checkpoint with other checkpoints on the other nodes and sends a common checkpoint to the storage mechanism.

8. A computer implemented method for checkpointing an application executing on a hybrid compute node, the method comprising the steps of:
halting the application executing on a processor of the hybrid compute node and waiting for a network to quiesce;
checkpointing the application to an accelerator local to the hybrid compute node;
resuming the application; and
processing checkpoint data and communicating the checkpoint data with a host for storage with checkpoint management software residing in the accelerator while the application continues to execute.

9. The computer implemented method of claim 8 wherein the accelerator compresses the checkpoint prior to sending the checkpoint to the storage mechanism.

10. The computer implemented method of claim 8 wherein the step of processing the checkpoint data at the accelerator comprises holding the checkpoint and waiting for the next checkpoint of the application.

11. The computer implemented method of claim 8 wherein the step of processing the checkpoint data at the accelerator comprises sending the checkpoint to a data storage mechanism such as a disk storage.

12. The computer implemented method of claim 8 wherein the step of processing the checkpoint data at the accelerator comprises communicating with other compute nodes to compare the checkpoint with other checkpoints on the other nodes and sending a common checkpoint to the storage mechanism.

13. The computer implemented method of claim 8 further comprising the steps of:
halting the processor;
reading a previously stored checkpoint from the accelerator; and
restarting execution of the application on the processor from the stored checkpoint.

14. A computer implemented method for checkpointing an application executing on a hybrid compute node, the method comprising the steps of:
halting the application executing on a processor of the hybrid compute node and waiting for a network to quiesce;
checkpointing the application to an accelerator local to the hybrid compute node;
resuming the application; and
processing checkpoint data at the accelerator with checkpoint management software residing in the accelerator while the application continues to execute by performing one of the following three steps:

a. holding the checkpoint and waiting for the next checkpoint of the application;
b. compressing the checkpoint prior to sending the checkpoint to a storage mechanism such as a disk storage;
c. communicating with other compute nodes to compare the checkpoint with other checkpoints on the other nodes and sending a common checkpoint to the storage mechanism;

halting the processor;

reading a previously stored checkpoint from the accelerator; and restarting execution of the application on the processor from the stored checkpoint.

15. A computer-readable article of manufacture comprising:

a checkpoint mechanism for checkpointing a hybrid compute node on a multi-node computer system comprising a plurality of hybrid nodes and a storage mechanism connected by a network, wherein each of the plurality of hybrid nodes comprise a processor and an associated accelerator;

checkpoint management software for execution in the accelerator;

wherein a checkpoint of the processor is made and written through a local operation in the node to the accelerator, wherein the checkpoint management software executing in the accelerator then processes the checkpoint by communicating checkpoint data over the network to the storage mechanism while the processor continues execution; and non-transitory computer recordable media bearing the computer checkpoint mechanism and the checkpoint management software.

16. The article of manufacture of claim 15 wherein the multi-node computer system is a high performance cluster computer system with the network being a private network.

17. The article of manufacture of claim 15 wherein a checkpoint manager in a service node manages checkpointing.

18. The article of manufacture of claim 15 wherein the accelerator sends the checkpoint to the storage mechanism.

19. The article of manufacture of claim 15 wherein the accelerator compresses the checkpoint prior to sending the checkpoint to the storage mechanism.

20. The article of manufacture of claim 15 wherein the accelerator communicates with other compute nodes to compare the checkpoint with other checkpoints on the other nodes and sends a common checkpoint to the storage mechanism.

* * * * *